US012565562B2

(12) United States Patent
Pearson et al.

(10) Patent No.: US 12,565,562 B2
(45) Date of Patent: Mar. 3, 2026

(54) SILANE TERMINATED POLYETHER EMULSIONS FOR COATING APPLICATIONS

(71) Applicant: Wacker Chemie AG, Munich (DE)

(72) Inventors: Andrew Pearson, Adrian, MI (US); Amanda Andrews, Petersburg, MI (US); Toby Vick, Toledo, OH (US)

(73) Assignee: Wacker Chemie AG, Munich (DE)

( * ) Notice: Subject to any disclaimer, the term of this patent is extended or adjusted under 35 U.S.C. 154(b) by 818 days.

(21) Appl. No.: 17/774,867

(22) PCT Filed: Dec. 11, 2019

(86) PCT No.: PCT/US2019/065629
§ 371 (c)(1),
(2) Date: May 6, 2022

(87) PCT Pub. No.: WO2021/118551
PCT Pub. Date: Jun. 17, 2021

(65) Prior Publication Data

US 2022/0396664 A1 Dec. 15, 2022

(51) Int. Cl.
*C08G 65/336* (2006.01)
*C09D 171/00* (2006.01)

(52) U.S. Cl.
CPC ......... *C08G 65/336* (2013.01); *C09D 171/00* (2013.01)

(58) Field of Classification Search
None
See application file for complete search history.

(56) References Cited

U.S. PATENT DOCUMENTS

| | | | |
|---|---|---|---|
| 9,328,259 | B1 | 5/2016 | Andrews |
| 2017/0121536 | A1 | 5/2017 | Marauska et al. |
| 2017/0369740 | A1 * | 12/2017 | Stanjek ................ C08G 65/336 |

FOREIGN PATENT DOCUMENTS

| | | | |
|---|---|---|---|
| CN | 107207899 | A | 9/2017 |
| JP | 2008121012 | A | 5/2008 |
| JP | 2008540745 | A | 11/2008 |
| JP | 2008540747 | A | 11/2008 |
| JP | 2018508609 | A | 3/2018 |
| WO | 2019159972 | A1 | 8/2019 |

* cited by examiner

*Primary Examiner* — Randy P Gulakowski
*Assistant Examiner* — Holley Grace Hester
(74) *Attorney, Agent, or Firm* — BROOKS KUSHMAN P.C.

(57) ABSTRACT

Silane-terminated polyether emulsions (STP-E emulsions) comprising a cyclohexylamino alkoxysilane catalyst may be formulated as storage stable 1K compositions. The STP-E emulsions are especially useful in coating applications.

9 Claims, No Drawings

SILANE TERMINATED POLYETHER EMULSIONS FOR COATING APPLICATIONS

BACKGROUND OF THE INVENTION

1. Field of the Invention

The present invention is directed to silane terminated polyether emulsions (STP-E emulsions) comprising a cyclohexylamino alkoxysilane catalyst, and the use of these STP-E emulsions in coating applications.

2. Description of the Related Art

Most building materials are porous, which subjects them to wetting from the outside, for example by rain. If the pores of the building material are filled with water, insulation properties of the material are adversely affected. Prolonged wetting also leads to moisture damage. Various coatings over masonry, plasters, cellulose and exterior insulation and finishing system (EIFS) have been developed, but a large number of the coatings have tendency to become brittle. Brittleness leads to cracking of the coatings, leaving a coating film with large surface cracks that are not functional and are unappealing. If water enters the coatings or substrate during freeze and thaw cycles, this can also lead to cracking.

Several coating systems have been developed to attempt to combat these problems, including systems incorporating elastomeric silicone emulsions. Proposed solutions have used either silicone emulsions without a catalyst or silicone emulsions comprising a post-added catalyst (2K system). The use of silicone emulsions without a catalyst provides high elasticity, but very low tensile strength. The 2K systems overcome these deficiencies with the addition of a catalyst, wherein the catalyst is added just prior to the application of the elastomeric silicone emulsion or elastomeric silicone emulsion containing coating. A myriad of catalysts are available for 2K systems that will cure the polymer and allow for sufficient pot life for the application of the coating. While 2K systems provide the benefit of catalyst curing, this requires the mixture of the catalyst just prior to application thus increasing overall coating time. In addition, 2K systems are not meant for long-term storage as the catalysts result in rapid curing.

U.S. Pat. No. 9,328,259 describes an elastomeric silicone emulsion for coating applications comprising a silane terminated polyether (STP-E) and optionally a catalyst. STP-E polymers are extremely sensitive to moisture, because that is the mechanism by which they cure. However, the STP-E polymers themselves cure extremely slowly in the absence of a catalyst. For application as a 2K system (the catalyst is admixed just prior to application) large numbers of catalysts are described in U.S. Pat. No. 9,328,259, for example metal compounds, carboxylic acids, bases such as alkali and earth alkali metal hydroxide, amines such as triorganyloxyamines, monoorganylamine, diorganylamine (cyclic systems such as piperidine, piperazine). These catalysts, if added just prior to application, will cure the polymer and allow enough pot life to be able to apply the coating. However, in 1K systems (systems that come ready to use with no mixing of chemicals required, e.g. catalyst) these catalysts cure the STP-E polymers during storage.

Therefore, there has been a long felt need to solve the above-mentioned problems. Specifically, there has been a long felt need to develop a 1K water-based system (systems that come ready to use with the catalyst added, requiring no mixing of chemicals) that allows for sufficiently fast curing upon application, while allowing for significant shelf-life to the emulsified polymers. Finally, there has been a long felt need to develop a 1K water-based system that provides good tensile strength, elasticity, tear resistance, and exposure durability as compared to non-catalyzed systems that will also increase shelf-life as compared to current 2K systems.

SUMMARY OF THE INVENTION

It has now been surprisingly and unexpectedly discovered that 1K water-based systems using silane terminated polyether polymers and cyclohexylamino alkoxysilanes may be formulated. Additionally, the inventive silane terminated polyether emulsions (STP-E emulsions) also result in increased tensile strength, tear resistance, and exposure durability over non-catalyzed systems, and significantly increase shelf-life over traditional 2K water-based systems. The inventive silane terminated polyether emulsions (STP-E emulsions) including cyclohexylamino alkoxy silane catalysts increase shelf-life to greater than six (6) months.

DETAILED DESCRIPTION OF THE PREFERRED EMBODIMENTS

The silane terminated polyether emulsions comprise essentially:

(A) a silyl-terminated polymer of formula (I)

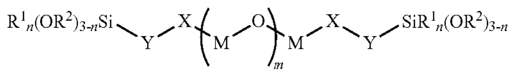

wherein $R^1$═$C_1$-$C_{12}$-alkyl, aryl, preferably the methyl radical, $R^2$α$C_1$-$C_{12}$-alkyl, preferably the methyl or ethyl radical, glycols, H, or aryl, X═O, $NR^3$, $R^3$═H, $C_1$-$C_{12}$-alkyl or aryl, preferably X═O, Y═—$(CH_2)_3$—, —$(CH_2)_3$NHC(═O)—, —$CH_2$—, —$CH_2$NHC(═O)—, wherein Y is Si—C bonded, preferably Y═—$(CH_2)_3$NHC(═O)—, —$CH_2$NHC(═O)—, more preferably Y═—$CH_2$NHC(═O)—, M═—$CH_2CH_2$—, —$CH_2CH(CH_3)$—, —$CH_2CH_2CH_2CH_2$—, preferably —$CH_2CH(CH_3)$—, wherein a majority of all M is —$CH_2CH(CH_3)$—, majority meaning ≥50%; preferably M is —$CH_2CH(CH_3)$— for ≥60%, ≥70%, ≥80%, or ≥90% of all M;

n=0-2, preferably 1;

m=1-500, preferably 10-30;

(B) a Cyclohexylamino alkoxy silane catalyst of the formula (II)

$R^1_n(OR^2)_{3-n}$—Si—$(CHR^3)_p$—NH-Cyclohexyl (II), wherein $R^1$═$C_1$-$C_{12}$-alkyl, aryl, preferably the methyl radical, $R^2$═$C_1$-$C_{12}$-alkyl, glycols, H, or aryl, $R^3$═H, $C_1$-$C_{12}$-alkyl or aryl, preferably H, and p=0-5, preferably 0-3, most preferred 1 or 2, (C) water optionally (D) a silicone compound containing units of the formula $$R^4_aR^5_b(R^6O)_cSiO_{(4-a-b-c)/2} \quad (II)$$

a=0-3, preferably 1, b=0-2, preferably 0, c=0, 1, 2, or 3, preferably 3, $R^4$=$C_1$-$C_{12}$-alkyl, aryl, aminoalkyl, glycidoxy alkyl, mercapto alkyl, $R^5$=$C_1$-$C_{12}$-alkyl, aryl, $R^6$=$C_1$-$C_{12}$-alkyl, H, ethylene oxide, propylene oxide, with the proviso that a+b+c≤4, corresponding to oligomers, polymers, and silanes; preferably, a+b+c<4, corresponding to oligomers or polymers; and optionally (E) emulsifier(s);

further optionally:

(F) filler(s) and/or pigments; and (G) other additive(s).

Specific examples of emulsions useful in the inventive 1K system comprise the following component (A):

Dimethoxymethylsilylmethylcarbamate-terminated polyether with methoxy group content of 0.25-0.3 mmol/g or 0.4-0.5 mmol/g of the structural formula:

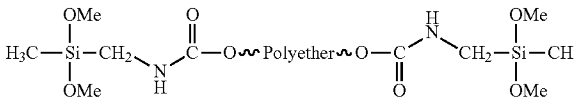

The silane-terminated polyether may have a molecular weight of 12,000 g/mol-18,000 g/mol and preferably a dynamic viscosity of 10,000 mPas-30,000 mPas, measured at 25° C. according to DIN 51562.

The emulsions may alternatively include the following exemplary silane-terminated polyethers, as component (A), either alone or in a combination:

Trimethoxysilylpropylcarbamate-terminated polyether with a methoxy content of about 0.5-0.7 mmol/g or about 0.35-0.45 mmol/g with and with a dynamic viscosity of 10,000 mPas-30,000 mPas, at 25° C. measured according to DIN 51562.

Dimethoxymethylsilylmethylcarbamate-terminated polyether with the following properties: density 1.0069 g/cm$^3$ at 20° C. measured according to DIN 51757, flash point 98° C. measured according to ISO 2719, dynamic viscosity about 30,000 mPas at 25° C. measured according to DIN 51562, and methoxy group content of about 0.4-0.5 mmol/g.

Dimethoxymethylsilylmethylcarbamate-terminated polyether with the following properties: density 1.0064 g/cm$^3$ at 25° C. measured according to DIN 51757, flash point >250° C. measured according to ISO 2592, dynamic viscosity about 10,000 mPas at 25° C. measured according to DIN 51562, and methoxy group content of about 0.5-0.7 mmol/g.

Particularly preferred as component (A) are gamma-silyl-terminated polymers of formula (I) wherein Y=—$(CH_2)_3$——$(CH_2)_3$NHC(=O)—.

The wt % of the silane terminated polyether may be about 15 wt %-60 wt %, more preferably about 30 wt %-55 wt %, most preferably 40 wt %-55 wt %, in each case based on the total formulation weight.

The silane terminated polyether emulsions comprise as component (B) a cyclohexylamino alkoxy silane catalyst of the formula (II) $R^1_n(OR^2)_{3-n}$—Si—$(CHR^3)_p$—NH— Cyclohexyl (II), wherein $R^1$=$C_1$-$C_{12}$-alkyl, aryl, preferably the methyl radical, $R^2$=$C_1$-$C_{12}$-alkyl, preferably the methyl or ethyl radical, glycols, H, or aryl, $R^3$=H, $C_1$-$C_{12}$-alkyl or aryl, preferably H, and p=0-5, preferably 0-3, most preferred 1 or 2.

Preferred are N-Cyclohexylaminomethyltriethoxysilane or N-Cyclohexylaminomethyltrimethoxysilane or N-Cyclohexyl-3-aminopropyltrimethoxysilane or N-Cyclohexyl-3-aminopropyltriethoxysilane or N-Cyclohexylaminoethylmethyldiethoxysilane or N-Cyclohexylaminoethylmethyldimethoxysilane.

The wt % of the cyclohexylamino alkoxy silane catalyst (B) maybe 0.05 wt %-5.0 wt %, preferably 0.1 wt %-1.0 wt %, most preferred 0.1 wt %-0.5 wt % in each case based on the weight of component (A).

The STP-E emulsion is an aqueous emulsion comprising water (C). The solids content of the emulsion is 35 wt %-80 wt %, preferably 60 wt %-75 wt %.

In a preferred embodiment the silane terminated polyether emulsions may also comprise one or more silicone resins, component (D), such as solventless, reactive, methoxyfunctional methyl-phenyl polysiloxanes with a narrow molecular weight distribution, which are highly suitable for introducing a compatible silicone component into other binder systems to increase the weathering or heat resistance. The methoxyfunctional methyl-phenyl polysiloxane is a clear liquid with total silicone content of about greater than 98 wt %, alkoxy content of about 1.5 wt %, and solvent content of less than 2 wt %.

The emulsions may alternatively include the following exemplary silicone resins as component (D). In each case mean molar mass $M_n$ and $M_w$ determined by GPC (calibrated against a polystyrene standard; THF as eluant; ELSD detector):

$(MeSiO_{3/2})_{0.88}(MeSi(OH)O_{2/2})_{0.05}(MeSi(OEt)O_{2/2})_{0.06}(Me_2SiO_{2/2})_{0.01}$ with Mw=6600 g/mol, Mn=2000 g/mol and Mw/Mn=3.3;

$(MeSiO_{3/2})_{0.86}(MeSi(OH)O_{2/2})_{0.02}(MeSi(OEt)O_{2/2})_{0.10}(Me_2SiO_{2/2})_{0.02}$ with Mw=10000 g/mol, Mn=2300 g/mol and Mw/Mn=4.3;

$(MeSiO_{3/2})_{0.71}(MeSi(OH)O_{2/2})_{0.03}(MeSi(OEt)O_{2/2})_{0.05}(Me_2SiO_{2/2})_{0.21}$ with Mw=4500 g/mol, Mn=1900 g/mol and Mw/Mn=2.4;

$(MeSiO_{3/2})_{0.88}(MeSi(OH)O_{2/2})_{0.05}(MeSi(OEt)O_{2/2})_{0.06}(Me_2SiO_{2/2})_{0.01}$ with Mw=9000 g/mol, Mn=2300 g/mol and Mw/Mn=3.9;

$(MeSiO_{3/2})_{0.33}(MeSi(OH)O_{2/2})_{0.05}(MeSi(OEt)O_{2/2})_{0.01}(Me_2SiO_{2/2})_{0.06}(PhSiO_{3/2})_{0.24}(PhSi(OH)O_{2/2})_{0.28}(PhSi(OEt)O_{2/2})_{0.03}$ with Mw=3250 g/mol, Mn=1300 g/mol and Mw/Mn=2.5;

$(MeSiO_{3/2})_{0.34}(MeSi(OH)O_{2/2})_{0.03}(MeSi(OEt)O_{2/2})_{0.02}(PhSiO_{3/2})_{0.45}(PhSi(OH)O_{2/2})_{0.13}(PhSi(OEt)O_{2/2})_{0.03}$ with Mw=4700 g/mol, Mn=1800 g/mol and Mw/Mn=2.6;

$(MeSiO_{3/2})_{0.27}(MeSi(OH)O_{2/2})_{0.03}(PhSiO_{3/2})_{0.34}(PhSi(OH)O_{2/2})_{0.14}(PhSi(OEt)O_{2/2})_{0.02}(PhMeSiO_{2/2})_{0.17}(PhMeSi(OH)O_{1/2})_{0.03}$ with Mw=2400 g/mol, Mn=1200 g/mol and Mw/Mn=2.0;

$(PhSiO_{3/2})_{0.45}(PhSi(OH)O_{2/2})_{0.44}(PhSi(OEt)O_{2/2})_{0.09}(PhSi(OH)_2O_{1/2})_{0.02}$ with Mw=2900 g/mol, Mn=1500 g/mol and Mw/Mn=1.9;

$(PhSiO_{3/2})_{0.48}(PhSi(OH)O_{2/2})_{0.17}(PhSi(OEt)O_{2/2})_{0.02}(CH_3(CH_2)_2SiO_{3/2})_{0.25}(CH_3(CH_2)_2Si(OH)O_{2/2})_{0.08}$ with Mw=1800 g/mol, Mn=1250 g/mol and Mw/Mn=1.4;

$(MeSiO_{3/2})_{0.32}(MeSi(OH)O_{2/2})_{0.06}(MeSi(OEt)O_{2/2})_{0.01}(Me_2SiO_{2/2})_{0.06}(PhSiO_{3/2})_{0.23}(PhSi(OH)O_{2/2})_{0.29}(PhSi(OEt)O_{2/2})_{0.03}$ with Mw=1700 g/mol, Mn=1200 g/mol and Mw/Mn=1.4;

$(PhSiO_{3/2})_{0.50}(PhSi(OH)O_{2/2})_{0.15}(PhSi(OEt)O_{2/2})_{0.02}(CH_3(CH_2)_2SiO_{3/2})_{0.26}(CH_3(CH_2)_2Si(OH)O_{2/2})_{0.07}$ with Mw=2800 g/mol, Mn=1200 g/mol and Mw/Mn=2.3;

$(MeSiO_{3/2})_{0.81}(MeSi(OH)O_{2/2})_{0.04}(MeSi(OEt)O_{2/2})_{0.05}(Me_2SiO_{2/2})_{0.10}$ with Mw=6500 g/mol, Mn=1900 g/mol and Mw/Mn=3.4; where Me is the methyl radical, Et is the ethyl radical, and Ph is the phenyl radical.

Further non-limiting examples of component (D) are:

$(SiO_{4/2})_{0.50}(Me_3SiO_{1/2})_{0.39}(Si(OEt)O_{3/2})_{0.06}(Si(OEt)_2O_{2/2})_{0.02}(Si(OEt)_3O_{1/2})_{0.01}(Si(OH)O_{3/2})_{0.02}$ with Mw=7400 g/mol, Mn=3100 g/mol and Mw/Mn=2.4;

$(SiO_{4/2})_{0.46}(Me_3SiO_{1/2})_{0.43}(Si(OEt)O_{3/2})_{0.07}(Si(OEt)_2O_{2/2})_{0.02}(Si(OEt)_3O_{1/2})_{0.01}(Si(OH)O_{3/2})_{0.01}$ with Mw=1400 g/mol, Mn=900 g/mol and Mw/Mn=1.6;

$(SiO_{4/2})_{0.46}(Me_3SiO_{1/2})_{0.37}(ViMe_2SiO_{1/2})_{0.06}(Si(OEt)O_{3/2})_{0.07}(Si(OEt)_2O_{2/2})_{0.02}(Si(OEt)_3O_{1/2})_{0.01}(Si(OH)O_{3/2})_{0.04}$ with Mw=5300 g/mol, Mn=2600 g/mol and Mw/Mn=2.0;

$(SiO_{4/2})_{0.38}(Me_3SiO_{1/2})_{0.42}(ViMe_2SiO_{1/2})_{0.06}(Si(OEt)O_{3/2})_{0.07}(Si(OEt)_2O_{2/2})_{0.02}(Si(OEt)_3O_{1/2})_{0.01}(Si(OH)O_{3/2})_{0.04}$ with Mw=2600 g/mol, Mn=1600 g/mol and Mw/Mn=1.6;

$(MeSiO_{3/2})_{0.37}(MeSi(OEt)O_{2/2})_{0.46}(MeSi(OEt)_2O_{1/2})_{0.17}$ with Mw=2400 g/mol, Mn=900 g/mol and Mw/Mn=2.7;

$(MeSiO_{3/2})_{0.37}(MeSi(OH)O_{2/2})_{0.01}(MeSi(OEt)O_{2/2})_{0.46}(MeSi(OEt)_2O_{1/2})_{0.15}(Me_2SiO_{2/2})_{0.01}$ with Mw=2400 g/mol, Mn=900 g/mol and Mw/Mn=2.7;

$(MeSiO_{3/2})_{0.29}(MeSi(OH)O_{2/2})_{0.01}(MeSi(OMe)O_{2/2})_{0.47}(MeSi(OMe)_2O_{1/2})_{0.23}$ with Mw=2300 g/mol, Mn=600 g/mol and Mw/Mn=3.8;

$(MeSiO_{3/2})_{0.32}(MeSi(OMe)O_{2/2})_{0.48}(MeSi(OMe)_2O_{1/2})_{0.20}$ with Mw=3300 g/mol, Mn=900 g/mol and Mw/Mn=3.7;

$(PhSiO_{3/2})_{0.23}(PhSi(OMe)O_{2/2})_{0.51}(PhSi(OMe)_2O_{1/2})_{0.26}$ with Mw=1000 g/mol, Mn=700 g/mol and Mw/Mn=1.4;

$(MeSiO_{3/2})_{0.10}(MeSi(OMe)O_{2/2})_{0.17}(MeSi(OMe)_2O_{1/2})_{0.03}(PhSiO_{3/2})_{0.15}(PhSi(OMe)O_{2/2})_{0.31}(PhSi(OMe)_2O_{1/2})_{0.20}(Me_2SiO_{2/2})_{0.04}$ with Mw=1800 g/mol, Mn=900 g/mol and Mw/Mn=2.0;

$(MeSiO_{3/2})_{0.10}(MeSi(OMe)O_{2/2})_{0.15}(MeSi(OMe)_2O_{1/2})_{0.03}(MeSi(O(CH_2)_3CH_3)O_{2/2})_{0.03}(PhSiO_{3/2})_{0.15}(PhSi(OMe)O_{2/2})_{0.24}(PhSi(OMe)_2O_{1/2})_{0.15}(PhSi(O(CH_2)_3CH_3)O_{2/2})_{0.06}(PhSi(OMe)(O(CH_2)_3CH_3)O_{1/2})_{0.04}(PhSi(O(CH_2)_3CH_3)_2O_{1/2})_{0.01}(Me_2SiO_{2/2})_{0.04}$ with Mw=1400 g/mol, Mn=800 g/mol and Mw/Mn=1.8;

$(i\text{-}OctSi(OMe)(OH)O_{1/2})_{0.01}(i\text{-}OctSi(OMe)_{2/2})_{0.10}(i\text{-}OctSi(OMe)_2O_{1/2})_{0.16}(MeSiO_{3/2})_{0.26}(MeSi(OMe)O_{2/2})_{0.36}(MeSi(OMe)_2O_{1/2})_{0.11}$ with Mw=3000 g/mol, Mn=1500 g/mol and Mw/Mn=2.0;

$(Si(OEt)_2O_{2/2})_{0.42}(Si(OEt)O_{3/2})_{0.19}(Si(OEt)_3O_{1/2})_{0.39}$ with Mw=1000 g/mol, Mn=800 g/mol and Mw/Mn=1.2;

$(Si(OEt)_2O_{2/2})_{0.48}(Si(OEt)O_{3/2})_{0.35}(Si(OEt)_3O_{1/2})_{0.09}(SiO_{4/2})_{0.08}$ with Mw=1400 g/mol, Mn=900 g/mol and Mw/Mn=1.6;

$(MeSiO_{3/2})_{0.23}(i\text{-}OctSiO_{3/2})_{0.06}(MeSi(OMe)O_{2/2})_{0.35}(i\text{-}OctSi(OMe)O_{2/2})_{0.09}(MeSi(OEt)_2O_{1/2})_{0.19}(i\text{-}OctSi(OEt)_2O_{1/2})_{0.08}$ with Mw=1400 g/mol, Mn=600 g/mol and Mw/Mn=2.3; and $(MeSiO_{3/2})_{0.22}(i\text{-}OctSiO_{3/2})_{0.05}(MeSi(OH)O_{2/2})_{0.01}(MeSi(OMe)O_{2/2})_{0.33}(i\text{-}OctSi(OMe)O_{2/2})_{0.11}(MeSi(OMe)_2O_{1/2})_{0.20}(i\text{-}OctSi(OMe)_2O_{1/2})_{0.8}$ with Mw=1500 g/mol, Mn=650 g/mol and Mw/Mn=2.3;

where in each case Me is the methyl radical, Vi is the vinyl radical, Et is the ethyl radical, i-Oct is 2,4,4-trimethylpentyl radical, and Ph is the phenyl radical.

The emulsions may further comprise a long chain alkylalkoxysilane as component (D). Long chain meaning a relatively long chain of atoms, preferably C8 to C30, more preferably C12 to C30. Further examples of component B, with a+b+c=4, are n-octyltrimethoxysilane, n-octyltriethoxysilane, 2,4,4-trimethylpentyltrimethoxysilane, 2,4,4-trimethylpentyltriethoxysilane, hexadecyltrimethoxysilane, hexadecyltriethoxysilane, n-nonacosyltriethoxysilane, n-nonacosyltrimethoxysilane, n-triacontyltrimethoxysilane, and n-triacontyltriethoxysilane, hexadecylmethyldimethoxysilane, hexadecylmethyldiethoxytrimethyl-pentyl)methyldimethoxysilane, trimethyl-pentyl)methyldiethoxysilane, n-octylmethyltrimethoxysilane, and n-octylmethyldiethoxysilane.

The wt % of the component (D) in the silane terminated polyether emulsions may be about 10 wt %-70 wt %; preferably about 25 wt %-50 wt %, based on the silane terminated polyether.

Component (E), the emulsifier, may be any suitable ionic emulsifier, nonionic emulsifier, Gemini emulsifier, or amphotropic emulsifier, individually and in the form of mixtures of different emulsifiers. The emulsifier may be used in pure form or as solutions of one or more emulsifiers in water or organic solvents.

Examples of suitable anionic emulsifiers are as follows:

Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.

Sulfonates, particularly alkylsulfonates having 8 to 18 carbon atoms, alkylarylsulfonates having 8 to 18 carbon atoms, taurides, esters, including monoesters, of sulfosuccinic acid with monohydric alcohols or alkylphenols having from 4 to 15 carbon atoms; if desired, these alcohols or alkylphenols may also have been ethoxylated with 1 to 40 EO units.

Alkali metal salts and ammonium salts of carboxylic acids having 8 to 20 carbon atoms in the alkyl, aryl, alkaryl, or aralkyl radical.

Phosphoric acid partial esters and their alkali metal salts and ammonium salts, particularly alkyl and alkaryl phosphates having 8 to 20 carbon atoms in the organic radical, alkyl ether phosphates and alkylaryl ether phosphates having 8 to 20 carbon atoms in the alkyl or alkaryl radical and 1 to 40 EO units.

Examples of nonionic emulsifiers are as follows:

Polyvinyl alcohol still containing about 5 wt %-50 wt %, preferably about 8 wt %-20 wt %, of vinyl acetate units, with a degree of polymerization of 500 to 3000.

Alkyl polyglycol ethers, preferably those having 3 to 40 EO units and alkyl radicals of 8 to 20 carbon atoms.

Alkylaryl polyglycol ethers, preferably those having 5 to 40 EO units and 8 to 20 carbon atoms in the alkyl and aryl radicals.

Ethylene oxide/propylene oxide (EO/PO) block copolymers, preferably those having 8 to 40 EO/PO units.

Adducts of alkylamines having alkyl radicals of 8 to 22 carbon atoms with ethylene oxide or propylene oxide.

Fatty acids having 6 to 24 carbon atoms.

Alkylpolyglycosides of the general formula R*—O—$Z_o$, in which R* is a linear or branched, saturated or unsaturated alkyl radical having on average 8 to 24 carbon atoms and $Z_o$ is an oligoglycoside residue containing on average o=1-10 hexose or pentose units or mixtures thereof.

Natural substances and derivatives thereof, such as lecithin, lanolin, saponins, cellulose; cellulose alkyl ethers and carboxyalkylcelluloses whose alkyl groups each possess up to 4 carbon atoms.

Linear organo(poly)siloxane-containing polar groups containing in particular the elements O, N, C, S, P, Si, especially those having alkoxy groups with up to 24 carbon atoms and/or up to 40 EO and/or PO groups.

Examples of cationic emulsifiers are as follows:

Salts of primary, secondary, and tertiary fatty amines having 8 to 24 carbon atoms with acetic acid, sulfuric acid, hydrochloric acid, and phosphoric acids.

Quaternary alkylammonium and alkylbenzeneammonium salts, especially those whose alkyl groups possess 6 to 24 carbon atoms, particularly the halides, sulfates, phosphates, and acetates.

Alkylpyridinium, alkylimidazolinium, and alkyloxazolinium salts, especially those whose alkyl chain possesses up to 18 carbon atoms, particularly the halides, sulfates, phosphates, and acetates.

Especially preferred is a combination of surfactants with at least one emulsifier having more than 16 EO units.

Specific examples of useful emulsifiers include nonionic secondary alcohol ethoxylates such as ethoxylated isotridecanol, ethoxylated castor oil, an ethoxylated nonionic emulsifier made from a saturated iso-C13 alcohol, octylphenol ethoxylate, the like, or a combination thereof, especially a blend of ethoxylated castor oil blended with an ethoxylated nonionic emulsifier made from a saturated iso-C13 alcohol.

The amount of the emulsifier may be about 1 wt %-20 wt % of the total formulation weight; more preferably about 2 wt %-15 wt %.

The inventive silane terminated polyether emulsion may be used to modify paints and coatings suitable for interior and/or exterior uses, such as coatings over masonry, plasters, cellulose, and EIFS substrates, or roof coatings or deck coatings. The paints and coatings may mean any liquid, liquefiable, or mastic composition, which converts to a solid fill after application to a substrate. The paints and coatings may be water-based such as aqueous emulsion/latex paints or acrylic paints; high-solids paints with low volatile organic compound content; or radiation curable coatings.

The paint or coating to be modified with the inventive silane terminated polyether emulsions may contain one or more of the following components: a binder, a diluent and/or solvent, pigment and/or fillers, and additives.

The binder is a film-forming component of the paint responsible for good adhesion of the coating to the substrate. The binder may include natural or synthetic resins such as alkyds, acrylics, vinyl, vinyl-acrylics, styrene acrylic, vinyl acetate/ethylene, phenol/formaldehyde condensates, polyurethanes, polyesters, nitrocellulose, polyamide, melamine resins, epoxy, or polymerizable oils.

The diluent or solvent serves as a medium in which the binder, filler, pigments, and additives are dispersed and/or adjusts the viscosity of the paint. The diluent may be water, optionally organic solvents such as aliphatic compounds, aromatic compounds, alcohols, ketones, mineral spirits, turpentine, and the like.

Pigments (F) may be used to contribute color or opacity, protect the substrate from UV light, increase hardness, decrease ductility, and/or adjust gloss level. The pigments may be synthetic or natural. Examples of pigments may include clays, calcium carbonate, mica, silicas, talcs, calcined clays, blanc fixe, precipitated calcium carbonate, synthetic pyrogenic silicas, the like, or a combination thereof.

Examples of inorganic pigments (F) may include aluminum pigments such as silicates of sodium and aluminum containing sulfur (ultramarine violet) and a complex naturally occurring pigment of sulfur-containing sodio-silicate ($Na_{8-10}Al_6Si_6O_{24}S_{2-4}$) (ultramarine); barium copper pigments such as Chinese purple ($BaCuSi^2O_6$) and dark blue ($BaCu_2Si_2O_7$), copper pigments such as a synthetic pigment of calcium copper silicate ($CaCuSi_4O_{10}$), cupric acetoarsenite ($Cu(C_2H_3O_2)_2 \cdot 3Cu(AsO_2)_2$); barium pigments such as barium sulfate ($BaSO_4 \cdot$); manganese pigments such as manganic ammonium pyrophosphate ($NH_4MnP_2O_7$); cobalt pigments such as cobalt stannate ($CoO_3Sn$), potassium cobaltinitrite ($Na_3Co(NO_2)_6$), cobalt chromite ($CoCr_2O_4$), cobalt titanate ($Co_2TiO_4$); iron pigments such as a synthetic pigment of ferric hexacyanoferrate ($Fe_7(CN)_{18}$), a naturally occurring clay of monohydrated ferric oxide ($Fe_2O_3 \cdot H_2O$), anhydrous $Fe_2O_3$; cadmium pigments such as cadmium sulfide (CdS), cadmium sulfoselenide ($Cd_2SSe$), cadmium selenide (CdSe); chromium pigments such as chromic oxide ($Cr_2O_3$), a pigment of hydrated chromic oxide ($Cr_2O_3 \cdot H_2O$), natural pigment of plumbous chromate ($PbCrO_4$), a naturally occurring pigment mixture composed of lead(II) chromate and lead(II) oxide ($PbCrO_4$+PbO); arsenic pigments such as monoclinic arsenic sulfide ($As_2S_3$); lead pigments such as lead antimonite ($Pb(SbO_3)_2$, basic plumbous carbonate ($(PbCO_3)_2 \cdot Pb(OH)_2$); mercury pigments such as mercuric sulfide (HgS); carbon pigments such as carbon black; antimony pigments such as stibous oxide ($Sb_2O_3$); zinc pigments such as zinc oxide (ZnO) or zinc chromate ($ZnCrO_4$); titanium pigments such as nickel antimony titanium yellow rutile ($NiO \cdot Sb_2O_3 \cdot 20TiO_2$) or titanium dioxide ($TiO_2$); a complex sulfur-containing sodio-silicate ($Na_{8-10}Al_6Si_6O_{24}S_{2-4}$) containing lazurite known as ultramarine blue, or the like.

Examples of organic pigments (F) may include diarylide aniline yellow pigment; benzimidazole yellow dyes; heterocyclic yellow dyes; disazo condensation yellow dyes such as arylide yellow, isoindoline yellow methane yellow, tetrachloroisoindolinone yellow, azomethine yellow, quinophthalone yellow, or triazinyl yellow, naphthol orange, calrion red, benzimidazolone orange: phthalocyannine green dyes with chemical formula ranging from $C_{32}H_3Cl_{13}CuN_8$ to $CrHCl_{15}CuN_8$, copper phthalocyannine; 8,18-dichloro-5, 15-diethyl-5,15-dihydrodiindolo(3,2-b:3',2'-m)tri-phenodioxazine known as diooxazine violet, or the like.

Pigments (F) may include hiding pigments protecting the substrate from UV light such as titanium dioxide, optionally coated with silica/alumina/zirconium, phthalocyannine blue dye, or red iron oxide.

Fillers (F) may be used for thickening of the film, reinforcing the binder, giving the paint texture, and/or increasing the paint volume. The fillers may include diatomaceous earth, talc, lime, barytes such as barium sulfate, clay, kaolin clay, precipitated or ground calcium carbonate, chalk, limestone, marble, magnesium carbonate, dolomite, fine quartz, silicates, the like, or a combination thereof.

Additives (G) may serve a variety of functions such as to modify surface tension, flow and leveling properties, appearance, gloss, texturing, increase wet edge and/or antifreeze properties, improve pigment stability, control foaming and/or skinning, modify rheology, modify mar resistance, act as catalysts, driers, thickeners, stabilizers, emulsifiers, texturizers, adhesion promoters, UV stabilizers, corrosion inhibitors, texturizers, de-glossing agents, biocides, fungicides, insecticides, algaecides, the like, or a combination thereof.

Examples of additives (G) may be silicone polyether copolymers, a dispersion of high molecular weight polysiloxane or polydimethylsiloxane and silicone surfactant as additives increasing mar resistance and providing or improving slip; ethylene oxide surfactants; silicone emulsions, fluorosilicone, organo-modified silicone copolymers as additives providing foam control; aminopropyltriethoxysilane, 3-methacryloxypropyltrimethoxysilane, cationic vinylbenzyl and amino-functional methoxy-silane glycidoxypropyltrimethoxysilane, silanol-functional additives, aqueous solutions of amino-functional silicone polymers as adhesion promoters and pigment treatment additives; silane/siloxane blends as additives promoting water resistance; arylalkyl-modified silicone, silicone polyether copolymers as additives improving leveling, and gloss; silicone elastomer particles with epoxy functionality improving abrasion resistance and addling a smooth, matter finish; silicone polyether copolymers as additives enhancing substrate wetting; 2,2'-(2,5-thiophenediyl)bis(5-tert-butylbenzoxazole) as an optical brightener; 2-[2-hydroxy-3,5-di-(1,1-dimethylbenzyl)]-2H-benzotriazole, 2-(2H-benzotriazole-2-yl)-4-methylphenyl as UV light absorbers; tris(2,4-di-tert-butylphenyl)phosphite, stearyl-3-(3',5'-di-tert-butyl-4-hydroxyphenyl) propionate, 2,2'-methylenebis(4-methyl-6-tert-butylphenol) as stabilizers; tetrachloroizo phthalonitrile, 3-iodo-2-propynyl butyl carbamate, 2-n-octyl-4-isothiazolin-3-one, diiodomethyl-p-tolysulphone, N-(trimethylthio) phtalamine, 1,2-benzisothiazolin-3-one as biocides; 2-(4-thiazolyl(benzimidazole), dichloroctylisothiazolone as fungicide/algaecide; potassium sodium phosphate as a buffer; hydrophobic copolymer polyelectrolyte as a pigment dispersant; modified hydroxyethyl methyl cellulose, as a thickener; modified polyols as foam suppressors; ester alcohol as a coalescent; calcium carbonate as an extender; talc as an additive to provide pigment spacing, firmness, anti-cracking, and barrier properties; aqueous butyl acrylate-styrene copolymer for dispersion; and (N-(2-aminoethyl)-3-aminopropyltrimethoxysilane, and aqueous acetic acid as catalysts. Any other additive for interior and exterior paint is also contemplated.

In addition, non-limiting examples of additives as component (G), such as preservatives, plasticizers, may be used in the emulsions of the present invention. Specific examples of additives useful in the present application include polyisobutylene, polypropylene glycol) as plasticizers, or N-dimethoxy (methyl)silylmethyl-O-methyl-carbamate to prevent premature curing. Additionally, reactive aminofluids may be used in the emulsions. A specific example of an aminofluid useful in the present application includes a reactive aminoethyl-aminopropylfunctional polydimethylsiloxane.

Any suitable method of preparing the silane terminated polyether emulsions may be used, and numerous such methods are disclosed in the patent and non-patent literature, including batch, semi-batch, and continuous processes. The ingredients are generally mixed under high shear, for example with the use of rotor/stator mixers. In a preferred method, the STP-E emulsion, and optionally the silicone ingredients and surfactant, are mixed with limited water to form a “stiff phase” emulsion, which may be a water-in-oil emulsion, and to this highly viscous emulsion is added the remainder of the water under high shear, continuously, in increments, or all at once, upon which addition the emulsion inverts to an oil-in-water emulsion with a very small and reproducible particle size.

Since the silane terminated polyether emulsions are already in the form of an emulsion, the addition to the coating composition may take place by simple mixing, i.e. using paddle mixers, vane mixers, and the like.

In the case of the various ingredients, one or more of each type of ingredient may be used.

EXAMPLES

A method of preparation of exemplary 1K elastomeric silicone emulsions of the general formula described above is provided in Example 1 below.

The silane terminated polyether emulsions of example 1 and of comparative examples 2 to 4 were prepared according to the following method utilizing the following compositions and weight percentages.

Ethox CO-200 and Lutensol TDA 9 were mixed with water on a Turrax® mixer until a foamy meringue was formed. The STP-E polymer and the silicone resin and the eyclohexylamino alkoxysilane component (or comparison component) were mixed into the meringue at about 10,000 rpm for about 4 minutes. Deionized water was added at about 5000 rpm for about 1 minute. Additional deionized water was added at about 5000 rpm for about 1 minute. Subsequently, additional deionized water was added at about 5000 rpm for about 1 minute.

| Example 1 | Amount (wt %) |
|---|---|
| PEG-200 castor oil (Ethox CO-200, Ethox Chemicals) | 8.00 |
| Ethoxylated tridecyl alcohol (Lutensol TDA 9, BASF) | 3.00 |
| Silicone Resin (Silres$^R$ IC 368, Wacker Chemie AG) | 12.80 |
| STP-E polymer (15 wt % Geniosil$^R$ STP-E15 and 85 wt % Geniosil$^R$ STP-E35, Wacker Chemie AG) | 42.42 |
| cyclohexylamino alkoxysilane (Geniosil$^R$ XL 926, Wacker Chemie AG) | 0.11 |
| Water | 33.67 |
| Total | 100.00 |

| Comparative Example 2 | Amount (wt %) |
|---|---|
| PEG-200 castor oil (Ethox CO-200, Ethox Chemicals) | 8.00 |
| Ethoxylated tridecyl alcohol (Lutensol TDA 9, BASF) | 3.00 |
| Silicone Resin (Silres$^R$ IC 368, Wacker Chemie AG) | 12.91 |
| STP-E polymer (15 wt % Geniosil$^R$ STP-E15 and 85 wt % Geniosil$^R$ STP-E35, Wacker Chemie AG) | 42.42 |
| Water | 33.67 |
| Total | 100.00 |

| Comparative Example 3 | Amount (wt %) |
|---|---|
| PEG-200 castor oil (Ethox CO-200, Ethox Chemicals) | 8.00 |
| Ethoxylated tridecyl alcohol (Lutensol TDA 9, BASF) | 3.00 |
| Silicone Resin (Silres$^R$ IC 368, Wacker Chemie AG) | 12.80 |
| STP-E polymer (15 wt % Geniosil$^R$ STP-E15 and 85 wt % Geniosil$^R$ STP-E35, Wacker Chemie AG) | 42.42 |
| (N-(2-aminoethyl)-3-aminopropyltrimethoxysilane | 0.11 |
| Water | 33.67 |
| Total | 100.00 |

| Comparative Example 4 | Amount (wt %) |
|---|---|
| PEG-200 castor oil (Ethox CO-200 Ethox Chemicals), | 8.00 |
| Ethoxylated tridecyl alcohol (Lutensol TDA 9, BASF) | 3.00 |
| Silicone Resin (Silres$^R$ IC 368, Wacker Chemie AG) | 12.80 |
| STP-E polymer (15 wt % Geniosil$^R$ STP-E15 and 85 wt % Geniosil$^R$ STP-E35, Wacker Chemie AG) | 42.42 |
| 1,1,3,3-tetramethylguanadine | 0.11 |
| Water | 33.67 |
| Total | 100.00 |

To assess the increased shelf-life of the formulations of the present invention Example 1 and Comparative Examples 2 to 4 were prepared and placed in a bottle. In the cases of Example 1 and Comparative Examples 3 and 4, a catalyst was present in the composition. The Examples were then applied in a thin film (50-75 wet mils) to a substrate to measure film curing. The test results are provided in the table below:

| SAMPLE | IN BOTTLE RESULTS | FILM RESULTS |
|---|---|---|
| Example 1 | No curing in the bottle | Cured as thin film |
| Comparative Example 2 | No curing in the bottle | No curing as film |
| Comparative Example 3 | Immediate cure in the bottle | N/A |
| Comparative Example 4 | Cured in bottle after 7 hours | Cured as thin film |

As shown in the results above, the inventive emulsion of Example 1 did not experience curing in the bottle and cured when applied as a film to a substrate. Comparative Example 2, without the addition of catalyst did not cure in the bottle and failed to cure when applied as a film to a substrate. Comparative Example 3, using a traditional catalyst experienced immediate curing in the bottle, and was unable to applied as film to the substrate. Comparative Example 4, using a traditional catalyst experienced minimal increased pot-life (7 hours) before curing, and was able to cure when applied as a film to a substrate. Thus, the inventive emulsion exhibit substantially increased pot-life and, the ability to cure when applied to a substrate.

Emulsions of the present invention are useful for one-part (1K) and two-part (2K) systems. Incorporating the emulsions into a paint or a coating results in a 1K system that has improved shelf-life. Additionally, the paint or coating gains excellent water repellency, protecting the substrate from moisture.

Additionally, a paint or coating modified with the emulsions of the present invention may be applied to a variety of substrates such as concrete, metal, or wood. The modified paint may be applied in one or more layers and is suitable for overcoating applications. The modified paints or coatings are substantially tack-free, exhibit fast absorption, easy application to a substrate, no dewetting problems after application of a second coat, and dryness to the touch after application.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A storage stable, 1K water-based system containing silane terminated polyether emulsions comprising: (A) a silyl-terminated polymer of formula (I), (I)

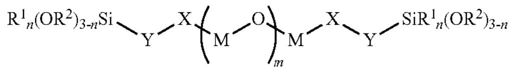

wherein $R^1$=Ci-$C_{12}$-alkyl or aryl, $R^2$=Ci-$C_{12}$-alkyl, X=0 or $NR^3$, $R^3$=H or Ci-C12-alkyl or aryl, M=independently —$CH_2CH_2$— or —$CH_2CH(CH_3)$— or —$CH_2CH_2CH_2CH_2$—, Y=—$(CH_2)$3-, —$(CH_2)_3$NHC(=0)-, —$CH_2$—, —$CH_2$NHC(=0)-, wherein Y is Si—C bonded, n=0-2, m=1-500, and (B) a cyclohexylamino alkoxy silane catalyst of the formula (II) $R^i_n(OR^2)_3$-n-Si—$(CHR^3)$p-NH-Cyclohexyl (II), wherein $R^1$=Ci-$C1_2$-alkyl or aryl, $R^2$=Ci-$C1_2$-alkyl or glycols or H or aryl, $R^3$=H or $C_i$-$C1_2$-alkyl or aryl, and p=0-5, and (C) water;

wherein the storage stable 1K water-based system has a shelf-life of greater than six months.

2. The storage stable, 1K water-based system of claim 1, wherein the silane terminated polyether emulsions comprise (A) a silyl-terminated polymer of formula (I), wherein Y=—$(CH_2)_3$— or —$(CH_2)_3$NHC(=O)—.

3. The storage stable, 1K water-based system of claim 1, wherein the silane terminated polyether emulsions comprise at least on component (B) selected from the group of consisting of N-Cyclohexylaminomethyltriethoxysilane, N-Cyclohexylamino-methyltrimethoxysilane, N-Cyclohexyl-3-aminopropyltrimethoxysilane, N-Cyclohexyl-3-aminopropyltriethoxysilane, N-Cyclohexylaminoethylmethyldiethoxysilane, and N-Cyclohexylaminoethylmethyldimethoxysilane.

4. The storage stable, 1K water-based system of claim 1, wherein the silane terminated polyether emulsions comprise a silicone compound (D) containing units of the formula $R^4_aR^5_b(R^6O)_cSiO_{(4-a-b-c)/2}$(II) wherein a=0-3,b=0-2, c=0 or 1 or 2 or 3, $R^4$=$C_1$-$C_{12}$-alkyl or aryl or aminoalkyl or glycidoxy alkyl or mercapto alkyl, $R^5$=$C_1$-$C_{12}$-alkyl or aryl, $R^6$=$C_1$-$C_{12}$-alkyl or H or ethylene oxide or propylene oxide, with the proviso that $a+b+c \leq 4$, corresponding to oligomers, polymers, and silanes.

5. The storage stable, 1K water-based system of claim 1, wherein the silane terminated polyether emulsions comprise an emulsifier (E).

6. The storage stable, 1K water-based system of claim 1, wherein the silane terminated polyether emulsions comprise (F) filler(s) and/or pigments; and optionally (G) other additive(s).

7. A coating or paint composition, comprising the storage stable, 1K water-based system of claim 1.

8. The coating or paint composition of claim 7, wherein the coating or paint composition is a coating or paint for masonry, plasters, cellulose, EIFS substrates, roof coatings or deck coatings.

9. The storage stable 1K water-based system of claim 1, wherein the silyl-terminated polymer of formula (I) is provided in an amount of 15 wt % to 60 wt %, based on the total weight of the system, and the cyclohexylamino alkoxy silane catalyst of the formula (II) is provided in an amount of 0.05 wt % to 5.0 wt % of cyclohexylamino alkoxy silane catalyst (B) based on the weight of the silyl-terminated polymer of formula (I), wherein the cyclohexylamino alkoxy silane catalyst is selected from the group consisting of N-cyclohexylaminomethyltriethoxysilane, N-cyclohexylaminomethyltrimethoxysilane, N-cyclohexyl-3-aminopropyltrimethoxysilane, N-cyclohexyl-3-aminopropyltriethoxysilane, N-cyclohexylaminoethylmethyldiethoxysilane, and N-cyclohexylaminoethylmethyldimethoxysilane, and wherein the solids content of the storage stable, 1K water-based system is from 35 wt. % to 80 wt. % based on the total weight of the system.

* * * * *